United States Patent [19]

Watanabe et al.

[11] Patent Number: 5,043,835

[45] Date of Patent: Aug. 27, 1991

[54] METHOD AND APPARATUS FOR ADJUSTING THE POSITION OF A MAGNETIC HEAD RELATIVE TO A RECORDING MEDIUM

[75] Inventors: Wataru Watanabe; Takashi Ichiyanagi, both of Osaka, Japan

[73] Assignee: Matsushita Electric Industrial Co., Ltd., Kadoma, Japan

[21] Appl. No.: 275,533

[22] PCT Filed: Mar. 8, 1988

[86] PCT No.: PCT/JP88/00242

§ 371 Date: Nov. 8, 1988

§ 102(e) Date: Nov. 8, 1988

[87] PCT Pub. No.: WO88/07253

PCT Pub. Date: Sep. 22, 1988

[30] Foreign Application Priority Data

Mar. 9, 1987 [JP] Japan .................. 62-53337

[51] Int. Cl.⁵ .................. G11B 5/56; G11B 5/596
[52] U.S. Cl. .................. 360/109; 360/77.03
[58] Field of Search ........... 360/102, 103, 104, 109, 360/77.01, 77.02, 77.03, 122, 75; 369/44

[56] References Cited

U.S. PATENT DOCUMENTS

| 3,992,576 | 11/1976 | Sugiura | 360/103 X |
| 4,071,854 | 1/1970 | Bijon et al. | 360/103 X |
| 4,320,426 | 3/1982 | Thompson | 360/104 |
| 4,809,105 | 2/1989 | Imanishi et al. | 360/104 |

FOREIGN PATENT DOCUMENTS

| 0097774 | 11/1984 | European Pat. Off. | 360/77.03 |
| 57-18056 | 1/1982 | Japan . | |
| 0003743 | 1/1984 | Japan | 360/103 |
| 60-166813 | 11/1985 | Japan . | |
| 0219637 | 11/1985 | Japan | 360/103 |
| 62-42363 | 2/1987 | Japan . | |
| 62-52759 | 3/1987 | Japan . | |
| 8402085 | 7/1985 | PCT Int'l Appl. | 360/77.03 |

OTHER PUBLICATIONS

IBM Technical Disclosure Bulletin vol. 15 No 4 Sep. 1972 Makosch et al., Measuring the flight height of magnetic heads on magnetic disks.

Primary Examiner—Robert S. Tupper
Assistant Examiner—Andrew L. Sniezek
Attorney, Agent, or Firm—Cushman, Darby & Cushman

[57] ABSTRACT

A method for adjusting the position of a magnetic head with respect to a magnetic recording medium includes use of a light beam. The beam illuminates the contact area between the magnetic head and the magnetic recording medium so as to generate an optical interference pattern. The position of the magnetic head is adjusted so that the generated interference pattern takes a predetermined pattern. In a disclosed embodiment, two heads sandwich a floppy disk, and one light beam passes through a transparent portion each head. Each beam also passes through a transparent portion of a floppy disk to illuminate the contact region.

17 Claims, 6 Drawing Sheets

METHOD AND APPARATUS FOR ADJUSTING THE POSITION OF A MAGNETIC HEAD RELATIVE TO A RECORDING MEDIUM

TECHNICAL APPLICATION FIELD

The present invention relates to a magnetic recording/reproducing apparatus using a disc-like flexible magnetic recording medium (which will be referred hereinafter to as floppy disc).

BACKGROUND OF THE INVENTION

Now, known is a means for performing the magnetic recording/reproduction on and from both sides of a floppy disc as shown in FIG. 7.

That is, a pair of head sliders 2, 3 are provided in opposed relation to each other so as to sandwich the floppy disc 1 therebetween under a predetermined force, and magnetic head portions 4, 5 embedded in the respective head sliders 2, 3 come into contact with the floppy disc 1 under predetermined surface pressures for magnetic recording and reproducing. The head sliders 2, 3, being made of a ceramic material, tightly wrap the magnetic head portions 4, 5 and the surfaces thereof coming into contact with the floppy disc 1 are ground smoothly.

In the magnetic recording/reproducing apparatus arranged thus, the recording/reproducing characteristic greatly depends upon the contact state between the magnetic heads 4, 5 and the magnetic recording medium. For example, in a case where the degree of the flatness of the floppy disc 1 is low, difficulty is encountered to in excellently performing the recording/reproducing because of not allowing the floppy disc to reform sufficiently between the pair of upper and lower head sliders 2, 3 so that the magnetic head portions 4, 5 are brought into contact with the floppy disc 1.

Such a problem is remarkable in the case of increased recording density. That is, as the recording density is higher, smaller gaps at the contact portions between the magnetic heads 4, 5 and the floppy disc 1 are required to be kept stably, and it is required to increase the degree of the flatness of the floppy disc 1 or to improve the relative position accuracy between the floppy disc 1 and the heads 4, 5. However, there are problems in that the manufacturing cost becomes higher, and the reproducing force for actually allowing the magnetic recording-/reproducing cannot be obtained.

On the other hand, the inventors and the other persons have already proposed a magnetic recording/reproducing apparatus (Japanese Patent Provisional Publication No. 62-52759) in which, as shown in FIG. 8, a disc-like magnetic recording medium 6 rotationally driven about a drive shaft is sandwiched from the upper and lower surfaces thereof by means of a pair of magnetic head devices 7, 8 with a predetermined contact pressure. The magnetic head device 6 comprises magnetic head chips 9, 10 and slider pads 11, 12 provided so as to surround the magnetic head chips 9, 10 at a predetermined interval, and the top portions of the magnetic head chips 9, 10 protrude by predetermined amounts with respect to the surfaces of the slider pads 11, 12 which come into contact with the medium.

FIG. 9 is a perspective view of the magnetic head device of FIG. 8 and shows the outline of the configuration of the slider pad 12. Furthermore, FIG. 10 shows another example of the magnetic head device which has a substantially circular slider pad surface 14, a magnetic head chip 13 being provided in the inside of the slider pad surface 14 so that the top portion protrudes by a dimension $\delta$ (which will hereinafter be referred to as head protruding amount) from the slider pad surface 14.

In a magnetic recording/reproducing apparatus, another magnetic head device having the same configuration as the illustrated magnetic head device 15 is combined therewith so as to sandwich both surfaces of the floppy disc 6 therebetween as well as the case of FIG. 8.

In the example shown in FIG. 10, a non-woven fabric 16 adheres to the slider pad surface 14 to decrease the sliding friction between the floppy disc 6 and the sliding pad. In this case, it is not required that the sliding pad body be made of a ceramic such as barium titanate which is difficult to be machined.

Here, in the case of the above-mentioned arrangement, in order to realize an excellent contact between the magnetic head chip and the floppy disc, it is required to keep the part accuracy high and the part-assembling accuracy, i.e., the interval between the magnetic head chips provided up and down through the floppy disc, the intervals between the magnetic head chips and the slider pads in the respective magnetic head devices, the surface configurations of the magnetic head chips slidably coming into contact with the floppy disc and the slider pads, the positions of the magnetic head chips with respect to the floppy disc, the head protruding amount $\delta$, and so on. However, in the actual producing place, this is at variance with real conditions from the viewpoint of increase in cost.

On the other hand, in the conventional magnetic recording/reproducing apparatus shown in FIG. 7, as a method for performing the relative positioning of the upper and lower magnetic heads, a reference signal is recorded in advance on a predetermined track of the floppy disc and read by means of a non-adjusting head. The shifting amount from the normal relative position of the upper and lower heads and the angular difference of the magnetic head chip with respect to the recording track are decided on the basis of the reproduction signal. In the case that this method is employed for the magnetic recording/reproducing apparatus as shown in FIG. 8, as compared with the magnetic recording/reproducing apparatus as shown in FIG. 7, as adjusting items are added the head protruding amount (e.g., for medium-travelling directions of the magnetic head chips and the magnetic head devices, for position of the medium seek direction and so on, difficulty is actually encountered in performing the adjustment using the above-mentioned method.

DISCLOSURE OF THE INVENTION

It is therefore a main object of the present invention is to provide a both-side type magnetic recording/reproducing apparatus which is capable of easily keeping a stable contact state of the magnetic head with respect to a floppy disc irrespective of curvature of the floppy disc or an error in the relative position relationship between the floppy disc and the magnetic head so as to allow high-density recording and reproducing.

The above-mentioned object of the present invention can be achieved by making an apparatus for recording and reproducing information with a disc-like magnetic recording medium rotationally driven about a drive shaft being sandwiched from the upper and lower sides between at least a pair of magnetic head devices under a predetermined contact pressure. Each of the magnetic head devices comprises: a magnetic head chip and a slider pad provided to surround the magnetic head chip to be spaced by a predetermined interval therefrom and the top portion of the head chip is arranged to protrude a predetermined amount with respect to the surface of the slider pad coming into contact with the medium, and a light-transmitting means provided at a side wall portion of the slider pad of each of the magnetic head devices.

The light-transmitting floppy disc is sandwiched by means of pair of magnetic head devices, and light penetrates by means of the light-transmitting means to illuminate at the contact region of the magnetic head chip and the floppy disc so as to generate an interference pattern. The head protruding amount ($\delta$) and the head position in accordance with the observation of the interference pattern, whereby the gap portion of the magnetic head is allowed to surely come into positive contact with the floppy disc to realize excellent recording/reproducing.

In detail, the light-transmitting means is made such that a small hole is formed in the side wall portion of the slider pad and a glass material or a resin material having an excellent light-penetrability is provided in the small hole.

MOST PREFERRED EMBODIMENT OF THE INVENTION

Figure 1:
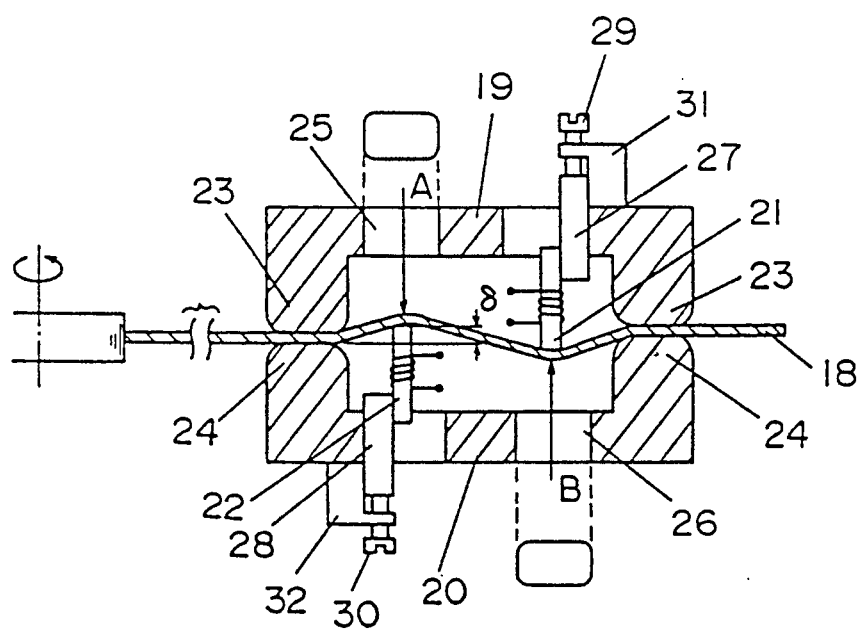
FIG. 1 is a side view showing the relation between a floppy disc and heads of a magnetic recording/reproducing apparatus according to an embodiment of the present invention.

FIG. 1 shows the contact state between a pair of magnetic head devices and a floppy disc in an embodiment of the present invention. In FIG. 1, numeral 18 represents a floppy disc rotationally driven, which is arranged so as to to allow light to penetrate from its upper surface and lower surface. That is, the floppy disc 18 is made by removing a magnetism layer of a medium of a general floppy disc.

Subsequently, numerals 19, 20 designate a pair of magnetic head devices, each comprising a magnetic head chip 21 or 22 and a slider pad 23 or 24. The slider pads 23, 24 are made of barium titanate or resin material having an excellent wear resistance characteristic, or made of a resin material including microscopic particles of PTFE (Polytetrafluoroethylene) having self-lubricating ability, and the surfaces thereof are ground smoothly so as not to damage the floppy disc through sliding contact therewith. Numerals 25, 26 depict means provided at side wall portions of the slider pads 23, 24 to transmit light and comprising small holes or arranged by providing glasses or resin materials with excellent light-penetrability in such small holes. The light-transmitting means 25, 26 are arranged so as to illuminate the contact portions between the floppy disc 18 and the magnetic head chips 21, 22 by light from directions of A and B in FIG. 1. Numerals 27, 28 are head-fitting members which are attached through adjusting screws 29, 30 to positioning member 31, 32. Furthermore, the positioning members 31, 32 are provided at the side wall portions of the slider pads 23, 24.

The slider pads 23, 24 are provided so as to surround the magnetic head chips 21, 22 to be spaced by predetermined intervals therefrom, and the adjustment of the heights and positions of the top portions of the magnetic head chips 21, 22 are performed by operating the adjusting screws 29, 30 with respect to the positioning members 31, 32 so that head gap portions (not shown) excellently come into contact with the floppy disc 18 with interference patterns being observed which are generated by illuminating the contact portions between the floppy disc 18 and the magnetic head chips 21, 22 by light travelling through the light-transmitting means 25, 26 in the A and B directions.

Figure 2:
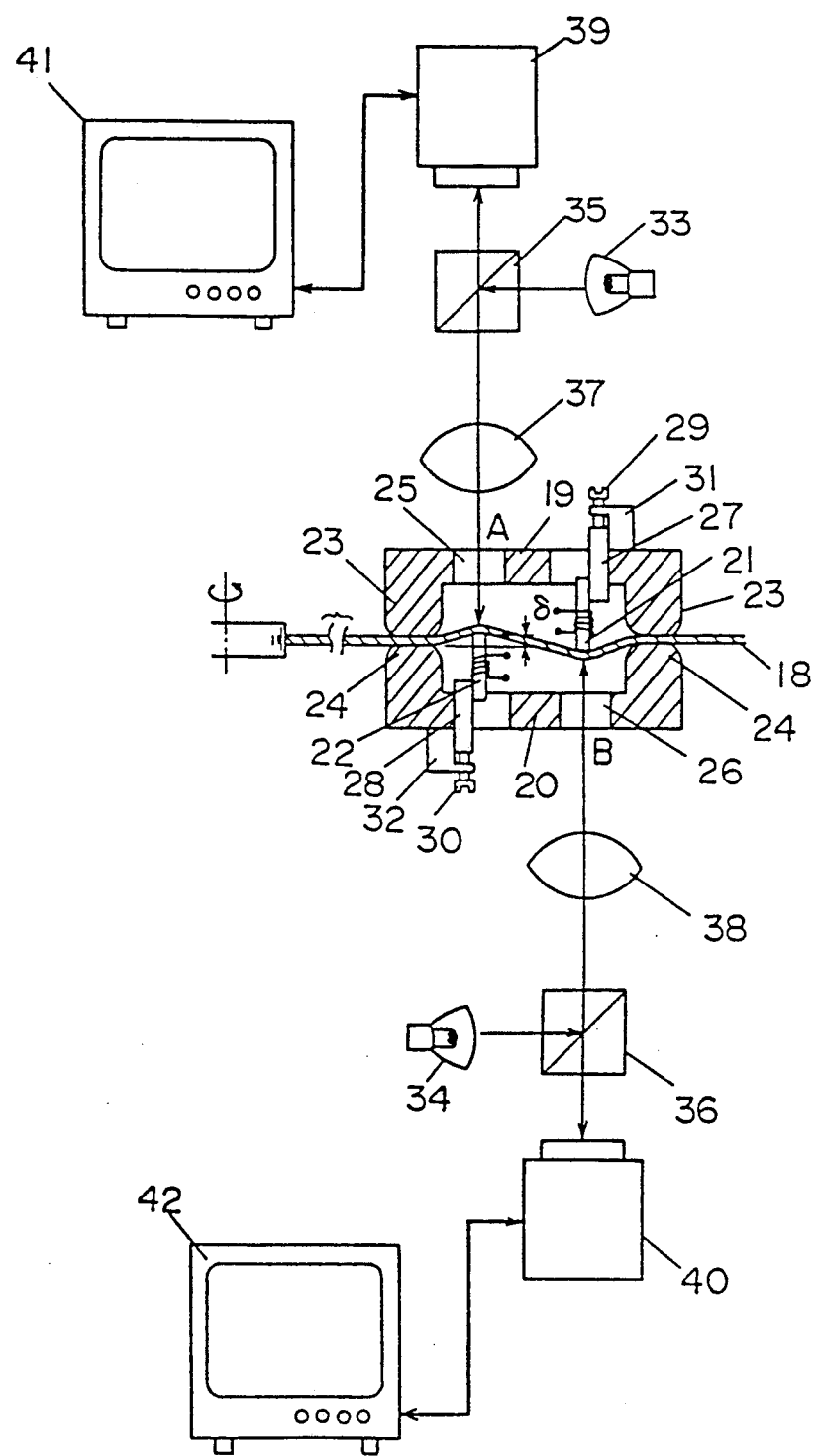
FIG. 2 is an illustration of an interference measurement system of this embodiment, FIG. 3(a-e) are illustrations for describing the contact states between a magnetic head chip and the floppy disc in this embodiment.

FIG. 2 illustrates one example of the arrangement of an interference pattern measuring system according to this embodiment, light emitted from light sources 33, 34 are refracted by prisms 35, 36 and then pass through condensing lenses 37, 38 to reach the contact portions between the magnetic head chips 21, 22 and the floppy disc 18 from the A and B directions, thereby resulting in generations of interference patterns. The interference patterns are image-picked up by means of television cameras 39, 40 and observed by means of monitor televisions 41, 42.

Figure 3:
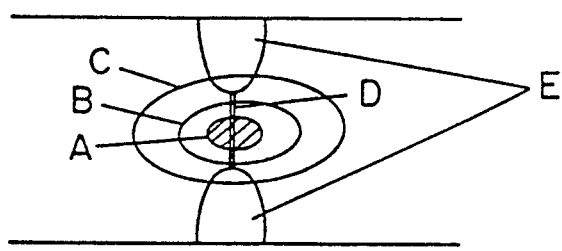
Figure 3:
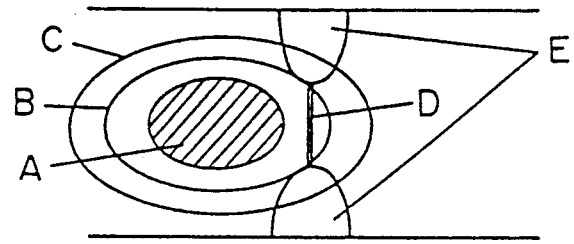
Figure 3:
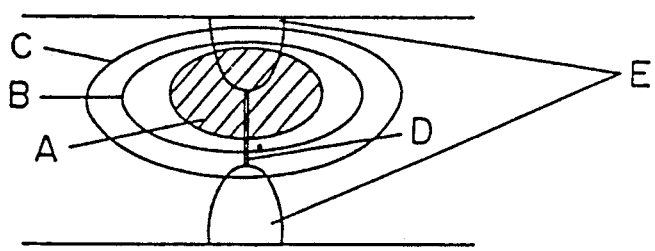
Figure 3:
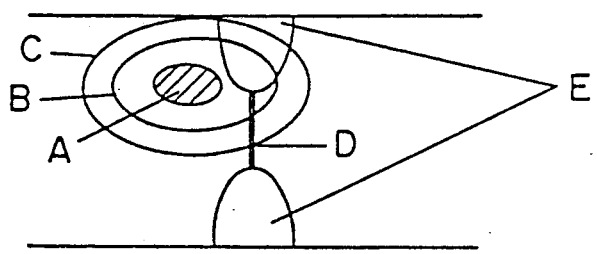
Figure 3:
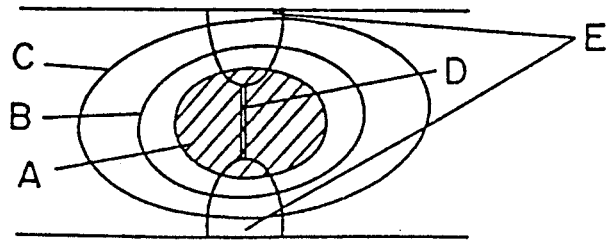

FIGS. 3a to 3d show interference patterns produced at the contact portion of the magnetic head chip with the floppy disc, and FIG. 3e shows an interference pattern corresponding to an ideal contact state. In FIGS. 3a to 3e, regions indicated by characters A and drawn with oblique lines represent 0-order interference patterns and show regions in which intervals are zero and the contacts are completely made. Furthermore, characters B and C show first-order interference patterns and second-order interference patterns and represent regions of intervals of $\lambda/2(\mu m)$ and $\lambda/(\mu m)$ respectively when the wave length of light to be used is $\lambda(\mu m)$. In addition, characters D and E respectively designate recording/reproducing gaps and glass-bonding portions. In FIGS. 3a to 3e, FIG. 3a illustrates the case that the contact between the magnetic head chip and the floppy disc is bad. In this case, sufficient recording/reproducing cannot be performed, because the contact region A does not cover the entire recording/reproducing gap B. Furthermore, FIGS. 3b and 3c respectively illustrate the cases that the contact region A is slipped in the medium-travelling direction of the magnetic head chip or in the medium seek direction with respect to the recording/reproducing gap. FIG. 3d shows the case of a combination of the factors of FIGS. 3a to 3c. These cases prevent excellent recording/reproducing. Thus, in the case of FIG. 3a, an excellent contact state as shown in FIG. 3e can be achieved by an increase the head-protruding amount δ. Furthermore, in the cases of FIGS. 3b and 3c, the shifting to the FIG. 3e state can be achieved by varying the positions of the medium seek direction and the medium-travelling direction of the magnetic head chip. In addition, in the case of FIG. 3d, as described above, an excellent contact state as shown in FIG. 3e can be obtained by performing all the adjustments made in the cases of FIGS. 3a to 3c.

Thus, by observing an interference pattern produced on the sliding-contact surface between the magnetic head chip and the floppy disc, it is possible to know the contact state of the magnetic head chip with respect to the floppy disc and further to determine an adjustment necessary for obtaining an excellent contact state. In addition, it is possible to surely obtain excellent contact in an extremely short time.

Although in this embodiment the positioning members 31, 32 and the adjusting screws 29, 30, being a mechanism for adjusting the heights and positions of the magnetic head chips 21, 22, are provided at the magnetic head devices 19, 20, it is also appropriate that an adjustment mechanism is provided at the other jig or the like and the respective magnetic head chips 21, 22 are positioned with respect to the magnetic head devices 19, 20 and then fixedly secured using an adhesive material or the like.

Figure 4:
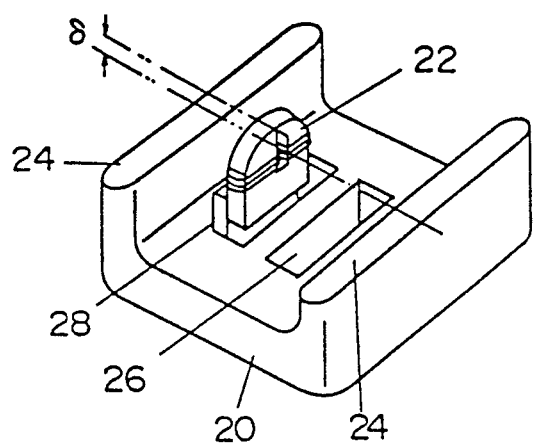
FIG. 4 is a perspective view showing a magnetic head device in the embodiment of this invention.

FIG. 4 is a perspective view of the magnetic head device of FIG. 1 and shows the outline of the configuration of the magnetic head device 20. Furthermore, FIG. 5 shows a head-supporting mechanism mounting the magnetic head devices.

Figure 5:
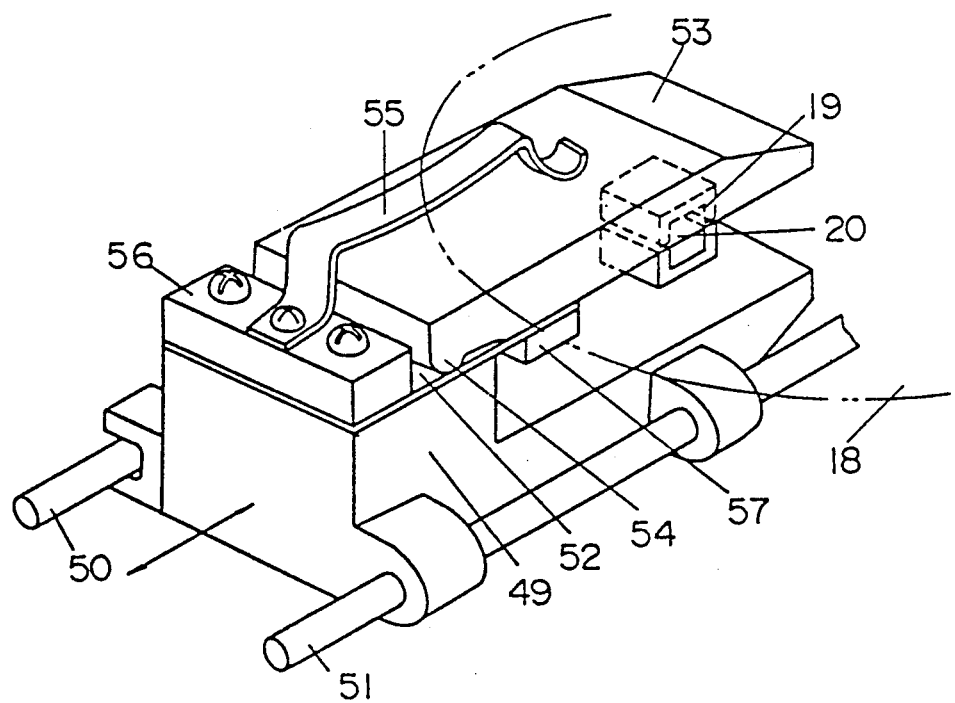
FIG. 5 is a perspective view showing the state that the magnetic head device is mounted on a head-supporting mechanism.

In FIG. 5, numeral 18 is a floppy disc, both surfaces of a Mylar-made sheet having a thickness of about 0.08 mm are coated by a magnetic material such as $\gamma$-$Fe_2O_3$.

Signal recording/reproducing is effected with this floppy disc 18 being sandwiched from both surfaces by means of the magnetic head devices 19, 20 under a predetermined contact pressure. Numeral 49 represents a carriage for holding the magnetic head device 20 which is reciprocally supported by two guide rods 50, 51 fixedly secured to a base of the apparatus. The magnetic head device 19 is fixedly secured through a gimbal (not shown) to an end portion of an arm 53 rotatably coupled through a leaf spring 52 to the carriage 49. At the rear-end portion of the arm 53 is provided a substantially arc-shaped pivot portion 54 which is arranged to form the center of rotational movement thereof, and the pivot portion 54 is coupled to the carriage 49 so as to pinch the leaf spring 52 by means of the biasing force of a biasing spring 55 provided to sandwich the floppy disc 18 between the magnetic head devices 19, 20 under a predetermined contact pressure. Numerals 56, 57 are respectively pressing plates for securing the leaf spring 52 to the carriage 49 or the arm 53.

The contact pressure between the pair of magnetic head devices in the above-mentioned supporting mechanism is principally used to reform the curvature of the floppy disc 18 and the deformation of the floppy disc 18 due to slippage of the position between the magnetic head devices 19, 20 and the floppy disc 18 in the up-and-down directions.

On the other hand, on the magnetic recording/reproducing, the contact pressure between the magnetic head chips 21, 22 and the floppy disc surfaces can be obtained as a deformation resistance when the magnetic head chips 21, 22 protrude by a dimension δ with respect to the floppy disc 18. That is, because the contact pressure substantially depends upon only the deformation resistance of the floppy disc 18 and protruding amount δ, if the protruding amount δ and the positions of the magnetic head chips are adjusted so that the head gap portions (not shown) of the magnetic head chips 21, 22 excellently come into contact with the medium 18, the contact states can be realized stably without being subjected to external factors, such as curvature of the floppy disc 18. High-density magnetic recording/reproducing which has been difficult heretofore can be achieved.

Although, in FIG. 1, the slider pads 23, 24 are provided in the radial directions of the floppy disc, it is also appropriate that they are provided in the circumferential directions (not shown) or in zigzag (not shown), i.e., in the radial directions and circumferential directions.

As is apparent from the above-mentioned embodiment, the slider pads are brought into sliding contact with the floppy disc, and at least a pair of magnetic head devices positioned apart by predetermined intervals from the slider pads 23, 24 and having magnetic head chips are provided so as to sandwich the floppy disc from its upper and lower surfaces therebetween. Light penetrates through a light-transmitting means 25, 26 provided at side wall portions of the slider pads 23, 24 so as to illuminate the contact portions between the floppy disc and the magnetic heads to produce interference patterns. With the observation of the interference patterns, the heights and positions of the top portions of the head chips are adjusted so that the head gap portions are excellently brought into contact with the floppy disc. The slider pad portions can reform the curvature of the floppy disc or the slippage of the relative position between the floppy disc and the magnetic head devices (particularly, the relative position slippage in directions normal to the surfaces of the floppy disc.) Stable contact states can always be realized stably because of removing the direct influence of the contact states between the floppy disc and the magnetic head chips.

Figure 6:
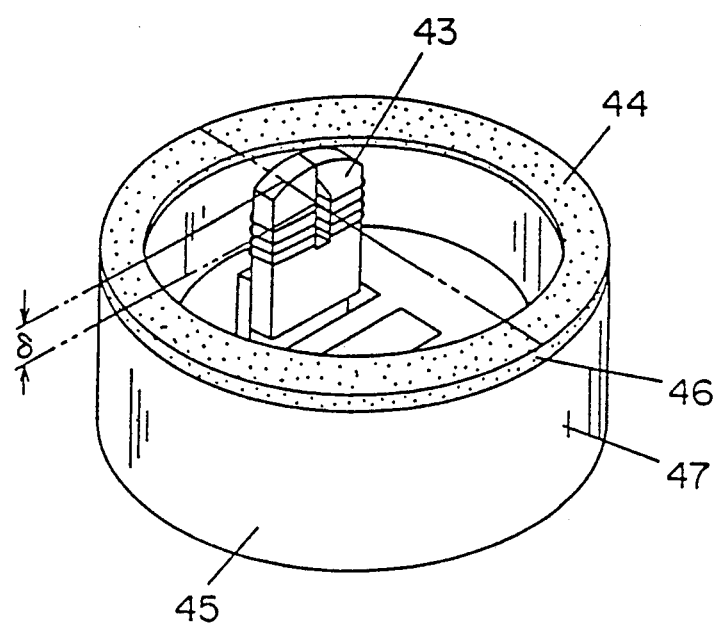
FIG. 6 is a perspective view of a magnetic head device in another embodiment of this invention.
Figure 7:
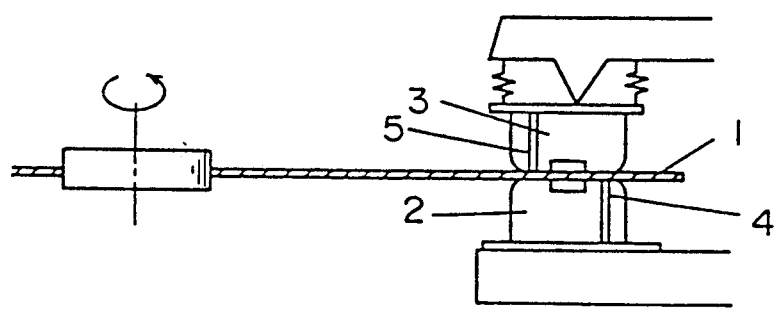
FIG. 7 is a side view showing a conventional magnetic recording/reproducing apparatus.
Figure 8:
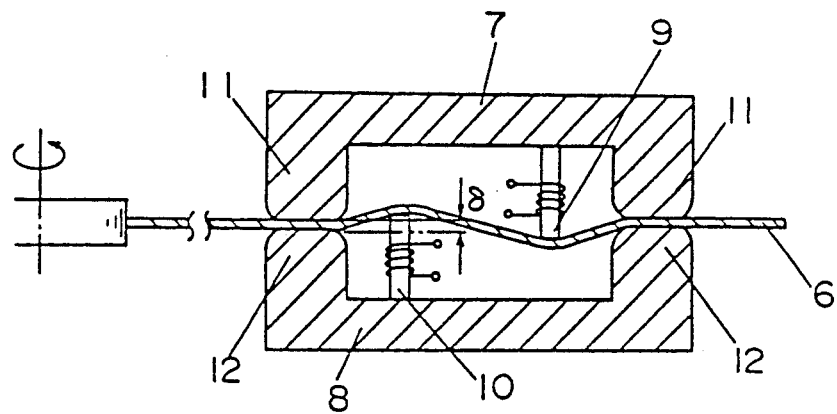
FIG. 8 is a side view showing another conventional apparatus.
Figure 9:
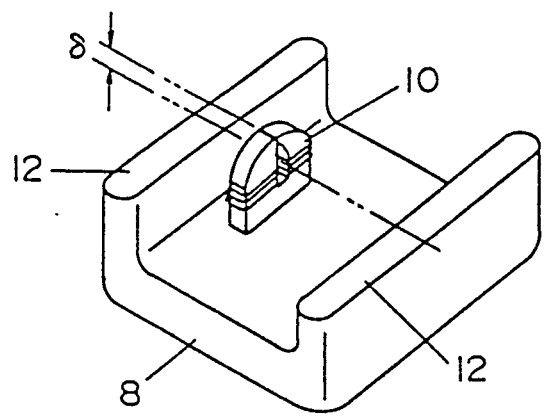
FIG. 9 is a perspective view of a magnetic head device in a conventional apparatus.
Figure 10:
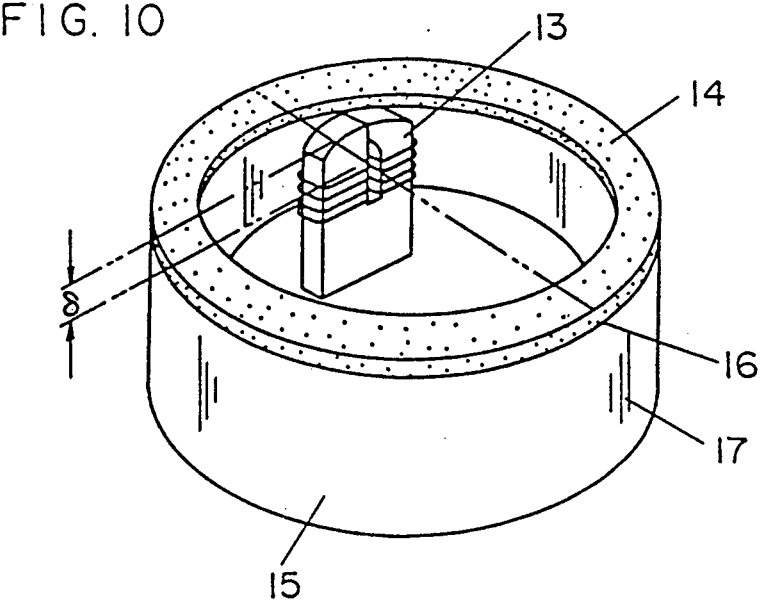
FIG. 10 is a perspective view showing another example of a magnetic head device in a conventional apparatus.

FIG. 6 shows a further embodiment of this invention, in which a substantially circular slider pad surface 44 is provided and a magnetic head chip 43 is provided in the inside of the slider pad 44. A magnetic recording/reproducing apparatus is arranged by combining another magnetic head device 45, having a configuration similar to that of the illustrated magnetic head device 45, therewith or combining the magnetic head device 45 with one not having a non-woven fabric and provided so as to sandwich both the surfaces of the floppy disc 19 as in the case of FIG. 1.

In this embodiment, a non-woven fabric 46 adheres to the slider pad surface 44 so as to decrease the sliding friction between the floppy disc 18 and the slider pad. In this case, the slider pad body is not required to be made of a ceramic such as barium titanate which is difficult to machine.

INDUSTRIAL UTILIZATION POSSIBILITY

As described above in detail, the contact pressure between a magnetic head chip and a floppy disc are determined in accordance with the protruding amount of the top portion of the magnetic head chip from the slider pad surface and the deformation resistance of the floppy disc. As a control method of the protruding amount, in the present invention a floppy disc is sandwiched between at least a pair of magnetic head devices and light penetrates through light-penetrating means provided at side wall portions of slider pads so as to illuminate contact portions between the magnetic heads and the transparent portion of the recording medium to produce interference patterns thereat. With observation of the interference patterns, it is possible to accurately control the protruding amount, the positions of the magnetic heads and so on, thereby allowing high-density magnetic recording/reproducing, which has been difficult heretofore.

What is claimed is:

1. A magnetic recording-reproducing apparatus for recording or reproducing information on and from a magnetic recording medium which is rotationally driven about a drive shaft and sandwiched from its upper and lower sides between a pair of magnetic head devices, wherein:

each of said pair of magnetic head devices comprises a magnetic head chip, a top portion of said head chip protruding by a predetermined amount from a surface of a slider pad surrounding said magnetic head chip and coming into sliding contact with said recording medium;

a light source generating a light beam aimed to reflect off a contact region between a magnetic head chip and the recording medium and to generate an interference pattern corresponding to a contact condition between the magnetic head chip and the recording medium; and means for adjusting the magnetic head chip so that the generated interference pattern forms a predetermined pattern indicative of a stable contact between the magnetic head chip and the recording medium.

2. A magnetic recording/reproducing apparatus as claimed in claim 1, wherein said light beam passes through a hole formed in a portion of said slider pad.

3. A magnetic recording/reproducing apparatus as claimed in claim 2, wherein a glass material or resin material having an excellent light-penetrability is fitted in said hole formed in said portion of said slider pad.

4. A magnetic recording/reproducing apparatus as claimed in claim 1, wherein said slider pad has a substantially circular configuration and said magnetic head chip is provided in the inside of said slider pad.

5. A magnetic recording/reproducing apparatus as claimed in claim 1, wherein a non-woven fabric is provided on a sliding contact surface of said slider pad which comes into contact with said magnetic recording medium.

6. A magnetic recording/reproducing apparatus as claimed in claim 1, wherein said slider pad is linearly provided in a tangential direction of a track of said magnetic recording medium.

7. A magnetic recording/reproducing apparatus as claimed in claim 1, wherein a ceramic material is provided on a sliding contact surface of said slider pad which comes into contact with said magnetic recording medium.

8. A magnetic recording/reproducing apparatus as claimed in claim 1, wherein a resin material is provided on a sliding contact surface of said slider pad which comes into contact with said magnetic recording medium.

9. A magnetic recording/reproducing apparatus as claimed in claim 8, wherein said resin material includes microscopic particles of PTFE having self-lubricating ability.

10. A system for adjusting a position of a magnetic head with respect to a magnetic recording medium which is in contact relation with said magnetic head, said system comprising:

illuminating means for emitting a light beam so as to illuminate and reflect off a contact region between said magnetic head and said magnetic recording medium to generate an optical interference pattern corresponding to a contact condition between said magnetic head and said magnetic recording medium;

image pick-up means for detecting the interference pattern; and means for adjusting the position of said magnetic head with respect to said magnetic recording medium so that the generated interference pattern forms a predetermined pattern indicative of a stable contact between the magnetic head and the recording medium.

11. A system as in claim 10 wherein the magnetic head is a recording/reproducing magnetic head.

12. A system as in claim 10 wherein the illuminating means comprises:

refracting means for refracting the light beam; and lens means for condensing the refracted light beam.

13. A system as in claim 10 wherein:

the magnetic recording medium includes a transparent portion; and the light beam penetrates the transparent portion to illuminate the contact region between the magnetic head and the magnetic recording medium.

14. A method for adjusting a position of a magnetic head with respect to a magnetic recording medium which is in contact relation with said magnetic head, comprising the steps of:

illuminating a contact region between said magnetic head and said magnetic recording medium with a light beam so as to generate an optical interference pattern corresponding to a contact condition between said magnetic head and said magnetic recording medium;

detecting the optical interference pattern; and adjusting the position of said magnetic head with respect to said magnetic recording medium so that the generated interference pattern forms a predetermined pattern indicative of a stable contact between the magnetic head and the recording medium.

15. A method as in claim 14 wherein the step of illuminating a contact region includes a step of refracting the light beam.

16. A method as in claim 14 wherein the step of illuminating a contact region includes a step of condensing the light beam.

17. A method as in claim 14 wherein the step of illuminating a contact region includes a step of passing the light beam through a transparent portion of the magnetic recording medium.

* * * * *